United States Patent
Mann et al.

(10) Patent No.: US 11,647,175 B2
(45) Date of Patent: May 9, 2023

(54) DETERMINING DEPTH INFORMATION FROM A SINGLE CAMERA

(71) Applicant: OmniVision Technologies, Inc., Santa Clara, CA (US)

(72) Inventors: Richard Mann, Santa Clara, CA (US); Badrinath Padmanabhan, Los Gatos, CA (US); Boyd Fowler, Sunnyvale, CA (US); Alireza Bonakdar, San Jose, CA (US); Eiichi Funatsu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/113,011

(22) Filed: Dec. 5, 2020

(65) Prior Publication Data
US 2021/0176447 A1   Jun. 10, 2021

Related U.S. Application Data

(60) Provisional application No. 62/944,979, filed on Dec. 6, 2019.

(51) Int. Cl.
| | |
|---|---|
| *H04N 13/218* | (2018.01) |
| *G06T 7/593* | (2017.01) |
| *H04N 13/257* | (2018.01) |
| *G06T 7/571* | (2017.01) |
| *H04N 23/67* | (2023.01) |

(52) U.S. Cl.
CPC ........... *H04N 13/218* (2018.05); *G06T 7/571* (2017.01); *G06T 7/593* (2017.01); *H04N 13/257* (2018.05); *H04N 23/672* (2023.01)

(58) Field of Classification Search
CPC ....... G06T 7/571; G06T 7/593; H04N 13/218; H04N 13/257; H04N 5/232122; H04N 23/672
USPC .......................................................... 348/49
See application file for complete search history.

(56) References Cited

U.S. PATENT DOCUMENTS

| | | | | |
|---|---|---|---|---|
| 4,079,394 A | * | 3/1978 | Roncone | G03B 11/06 396/337 |
| 9,485,442 B1 | | 11/2016 | Li et al. | |
| 2009/0096050 A1 | * | 4/2009 | Park | H01L 27/14685 257/432 |
| 2015/0362698 A1 | * | 12/2015 | Lansel | H04N 9/04557 348/360 |
| 2016/0286108 A1 | * | 9/2016 | Fettig | H04N 9/04557 |
| 2019/0008388 A1 | * | 1/2019 | Ando | G01J 3/0208 |

(Continued)

*Primary Examiner* — Christopher S Kelley
*Assistant Examiner* — Ana Picon-Feliciano

(57) ABSTRACT

An optical system comprises an imaging lens for imaging an object to an image and a sensing pixel array for detecting lights from the object toward the image. The sensing pixel array comprises a first sensing pixel and a second sensing pixel, each sensing pixel comprising a microlens covering a one-dimensional series of photodiodes having n photodiodes. A photodiode at an end of the one-dimensional series of photodiodes of the first sensing pixel detects a first light from the object toward the image, and a photodiode at an opposite end of the one-dimensional series of photodiodes of the second sensing pixel detects a second light from the object toward the image, where the first light and the second light pass opposite parts of the imaging lens.

20 Claims, 12 Drawing Sheets

(56) References Cited

U.S. PATENT DOCUMENTS

2020/0075652 A1\* 3/2020 Chen .................. G06F 3/012
2021/0067703 A1\* 3/2021 Kadambala ...... H04N 5/232122

\* cited by examiner

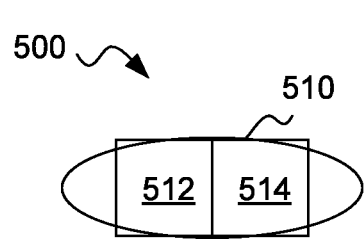 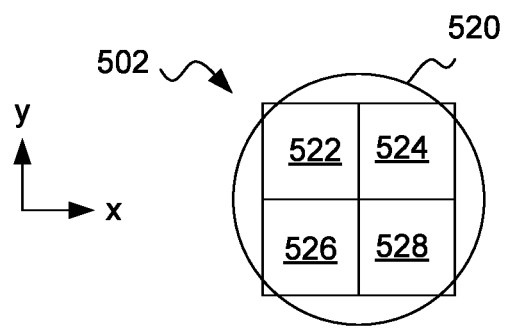
Fig. 5A					Fig. 5B
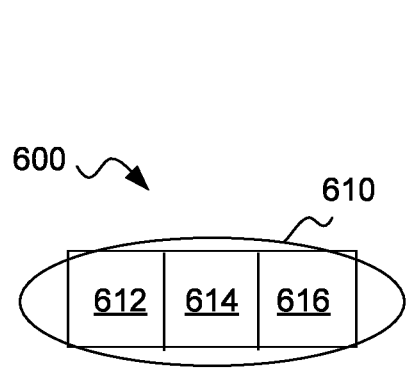 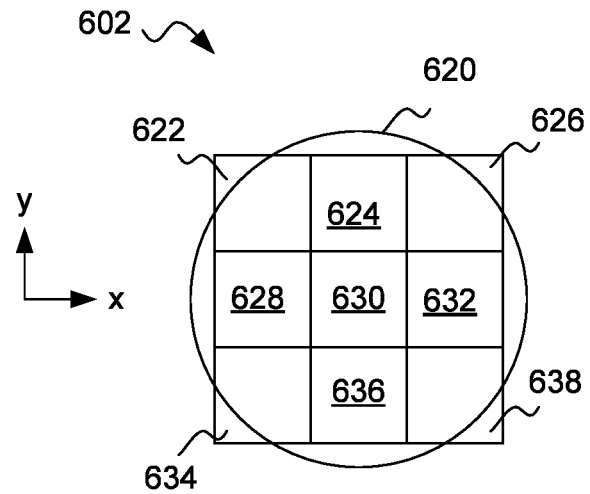
Fig. 6A					Fig. 6B

DETERMINING DEPTH INFORMATION FROM A SINGLE CAMERA

CROSS-REFERENCE TO RELATED APPLICATION

This application claims the benefits of U.S. Provisional Application No. 62/944,979, filed Dec. 6, 2019, which is hereby incorporated by reference.

FIELD OF THE INVENTION

This invention relates to determining depth information from a single camera, and more specifically relates to determining depth information from a single camera using sensing pixels each comprising a microlens and multiple photodiodes under the microlens.

BACKGROUND OF THE INVENTION

Capturing a 3D image may be based on determining the depth information of elements of a surface from a camera. Methods and apparatus for determining depth information of a surface from a camera using a single camera are disclosed.

There are many solutions for capturing 3D images including stereo camera, time-of-flight, and structure light. In the solution using structure light, the structure light emitted by vertical cavity surface emitting lasers (VCSELs) is projected on a target surface. In the solution using time-of-flight, a laser pulse is projected on the target surface. If the target is a human face, the projected laser light may cause injury to the human eye. 3D imaging of human face recently is used for unlocking a smart phone.

The stereo camera solution needs a sufficient parallax, which in turn needs a relatively large base line between two cameras. The time-of-flight solution needs an advanced electronic processor to determine the extremely short time difference between the light firing time and the reflected light receiving time. The structure light solution needs a relatively more complex optical system for projecting the structure light, thus it may be relatively large for being use in smart phones.

Accordingly, new solutions for capturing 3D images, especially for being used in smart phones, are demanded. The new solutions may not change the size of the device such as a smart phone, and ideally may not change the basic elements of a camera, so it would not complicate the device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5A illustrates a sensing pixel comprising a microlens covering two photodiodes, in accordance with an embodiment of the present invention.

FIG. 5B illustrates a sensing pixel comprising a microlens covering 2×2 photodiodes, in accordance with an embodiment of the present invention.

FIG. 6A illustrates a sensing pixel comprising a microlens covering three photodiodes, in accordance with an embodiment of the present invention.

FIG. 6B illustrates a sensing pixel comprising a microlens covering 3×3 photodiodes, in accordance with an embodiment of the present invention.

Figure 1:
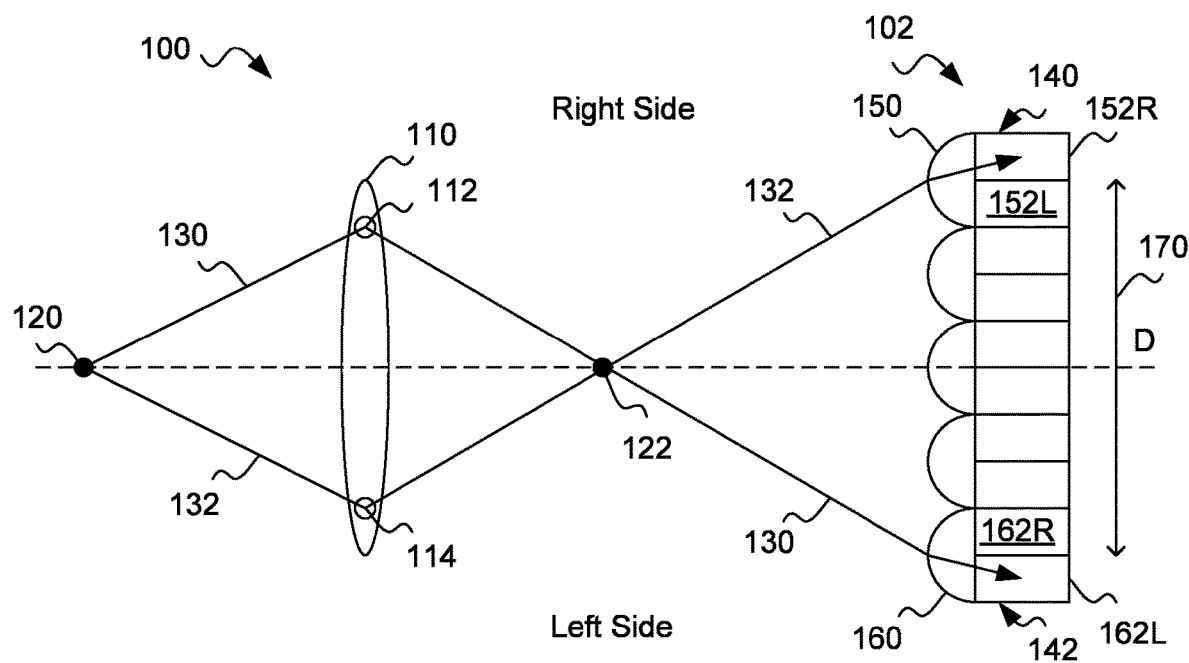
FIG. 1 schematically illustrates an optical system to describe the principle of phase-detection auto focus (PDAF), in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 schematically illustrates an optical system 100 to describe the principle of phase-detection auto focus (PDAF), in accordance with an embodiment of the present invention. Optical system 100 comprises an imaging lens 110 and an array of sensing pixels 102 comprising sensing pixels 140, 142, and others. Array of sensing pixels and sensing pixel array have the same meaning. Sensing pixel 140 comprises a microlens 150, a right photodiode 152R, and a left photodiode 152L. Similarly, sensing pixel 142 comprises a microlens 160, a right photodiode 162R, and a left photodiode 162L.

An object 120 is imaged by imaging lens 110 to form an image 122. Array of sensing pixels 102 detects lights from object 120, where each light passes different part of imaging lens 110 toward image 122. Imaging lens 110 is covered by a mask (not shown), which has opening 112 and opening 114. Opening 112 and opening 114 are at opposite parts of imaging lens 110. Light 130 from object 120 passes through opening 112 and arrives at imaging pixel 142. Light 130 is refracted by microlens 160 toward left photodiode 162L. Light 132 from object 120 passes through opening 114 and arrives at imaging pixel 140. Light 132 is refracted by microlens 150 toward right photodiode 152R. Light 130 and light 132 intersect at image 122. Light 130 and light 132 pass opposite parts of imaging lens 110.

In array of sensing pixels 102, only right photodiode 152R of sensing pixel 140 detects light 132, which comes from the left side, shown as the lower part of the figure. And only left photodiode 162L of sensing pixel 142 detects light 130, which comes from the right side, shown as the upper part of the figure. Left photodiode 152L of sensing pixel 140 and right photodiode 162R of sensing pixel 142 do not detect light from object 120.

All right photodiodes of sensing pixels are selected to form a right image, and all left photodiodes of sensing pixels are selected to form a left image. In this particular example, object 120 is imaged in the right image at sensing pixel 140. Object 120 is imaged in the left image at sensing pixel 142. A distance D 170 is the distance between sensing pixels 140 and 142. Distance D 170 is the distance between the right image and the left image of object 120. If distance D 170 is known, the distance between openings 112 and 114 is known, and the distance between imaging lens 110 and array of sensing pixels 102 is known, the position of image 122 can be determined. The position of image 122 depends on the position of object 120, thus the position of object 120 relative to imaging lens 110 can also be determined. In other words, the positions of sensing pixels 140 and 142 are used to determine the distance of object 120 to imaging lens 110. Thus, the depth information of object 120 from imaging lens 110 can be determined using a single camera comprising imaging lens 110 and array of sensing pixels 102. Accordingly, a 3D surface, such as human face, which is formed by a plurality of objects 120, can be obtained.

Sensing pixel 140 comprises microlens 150 covering a pair of photodiodes 152R and 152L and sensing pixel 142 comprises microlens 160 covering a pair of photodiodes 162R and 162L. Photodiode 152R at a side, right side, of the pair of photodiodes of sensing pixel 140 detects light 132 from object 120 toward image 122, and photodiode 162L at an opposite side, left side, of the pair of photodiodes of sensing pixel 142 detects light 130 from object 120 toward image 122. Light 132 and light 130 pass opposite parts of imaging lens 110.

Optical system 100 can also perform auto focus. When distance D 170 is zero, image 122 is on array of sensing pixels 102. In other words, array of sensing pixels 102 detects a focused image. For example, distance D 170, which is the distance of the right image and left image of object 120, is typically determined by a correlation between the right and left images formed by right and left photodiodes, respectively.

Figure 2:
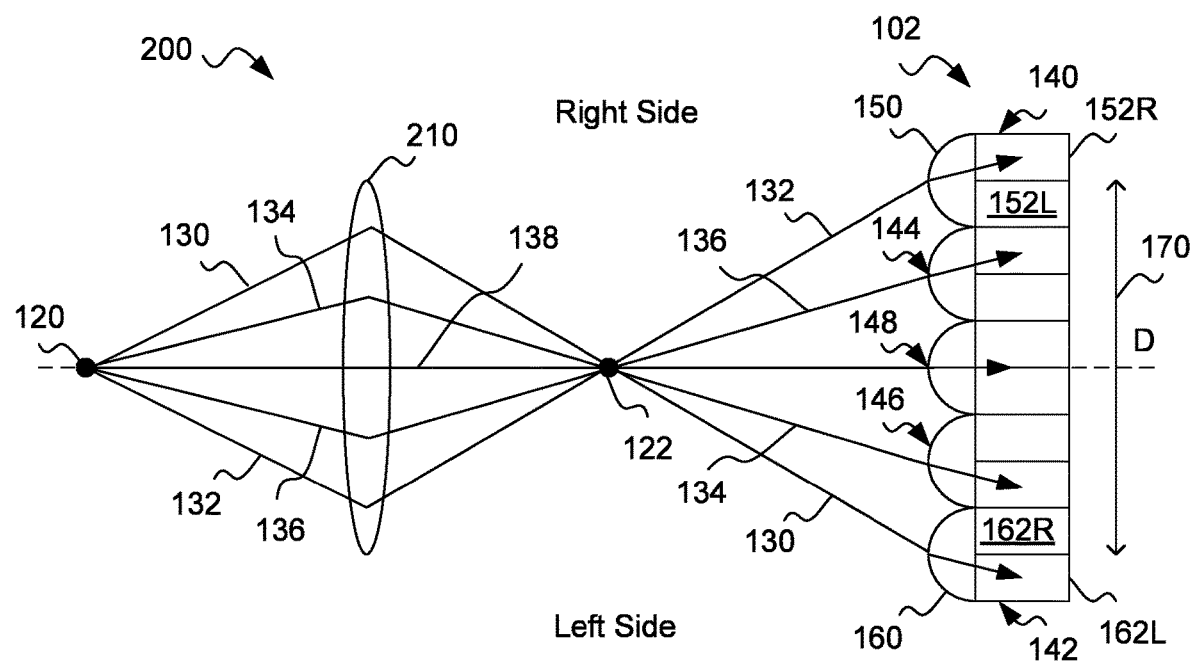
FIG. 2 schematically illustrates an optical system similar to the optical system of FIG. 1, in accordance with an embodiment of the present invention.

However, in some embodiment, imaging lens 110 is not covered by any mask having openings 112 and 114. FIG. 2 schematically illustrates an optical system 200 similar to optical system 100 of FIG. 1, in accordance with an embodiment of the present invention. An imaging lens 210 is not covered by any mask, thus all lights 130, 132, 134, 136, and 138 pass through different parts of imaging lens 210, and intersect at image 122. Light 130 coming from right side arrives at sensing pixel 142, and will be refracted toward left photodiode 162L of sensing pixel 142. Light 134 also coming from right side arrives at a sensing pixel 146, and will be refracted toward the left photodiode of sensing pixel 146. Light 132 coming from left side arrives at sensing pixel 140, and will be refracted toward right photodiode 152R of sensing pixel 140. Light 136 also coming from left side arrives at a sensing pixel 144, and will be refracted toward the right photodiode of sensing pixel 144. Light 138 will be equally divided between the right and left photodiodes of a sensing pixel 148 or may be blocked by a divider between the right and left photodiodes.

The formed right image includes sensing pixels 140 and 144 having right photodiode signals of lights from object 120. Similarly, the formed left image includes sensing pixels 142 and 146 having left photodiode signals of lights from object 120. Thus the determination of distance D 170 will not be precise. The right image and the left image of object 120 blur from one pixel to two pixels. In other words, the signal to noise ratio decreases. Consequently, the 3D reconstruction of a surface will also deteriorate.

Figure 3:
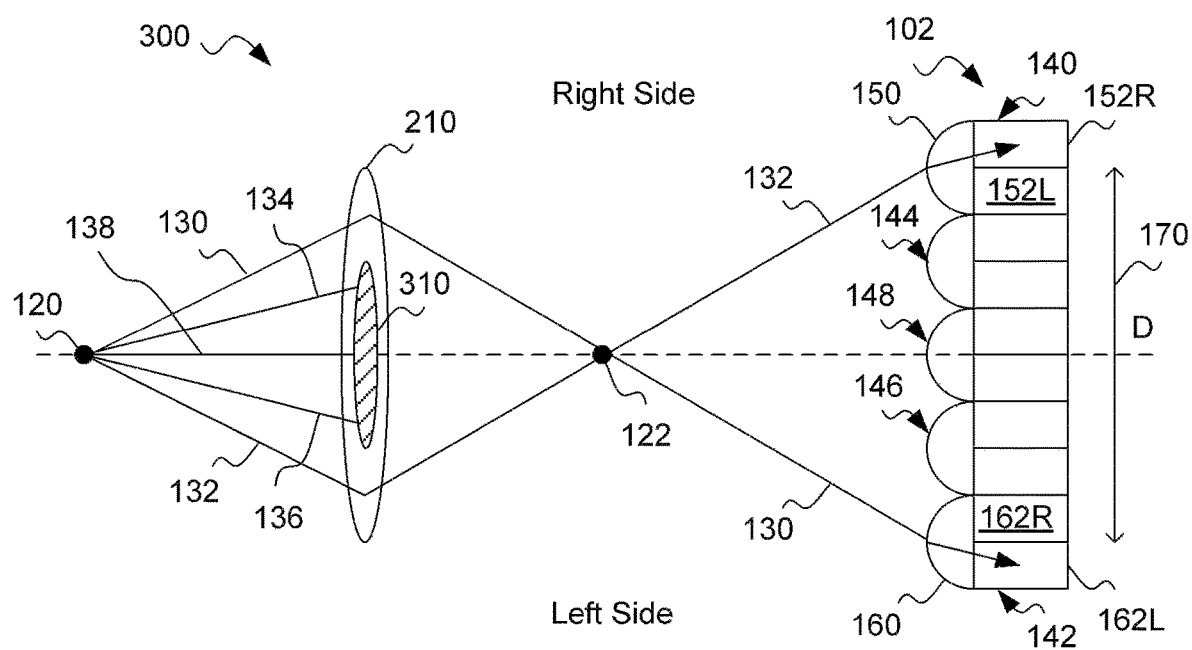
FIG. 3 schematically illustrates an optical system similar to the optical systems of FIG. 1 and FIG. 2, in accordance with an embodiment of the present invention.

FIG. 3 schematically illustrates an optical system 300, in accordance with an embodiment of the present invention. FIG. 3 is similar to FIG. 1 and FIG. 2. Imaging lens 210 is covered by a central mask 310 to block lights 134, 136, and 138 propagating from object 120 to image 122 through the central part of imaging lens 210. In this manner, the effect of openings 112 and 114 shown in FIG. 1 can be approached. It is appreciated that a low F-number lens will provide a better phase difference detection. Because a low-F-number lens will produce a larger distance D 170.

Figure 4:
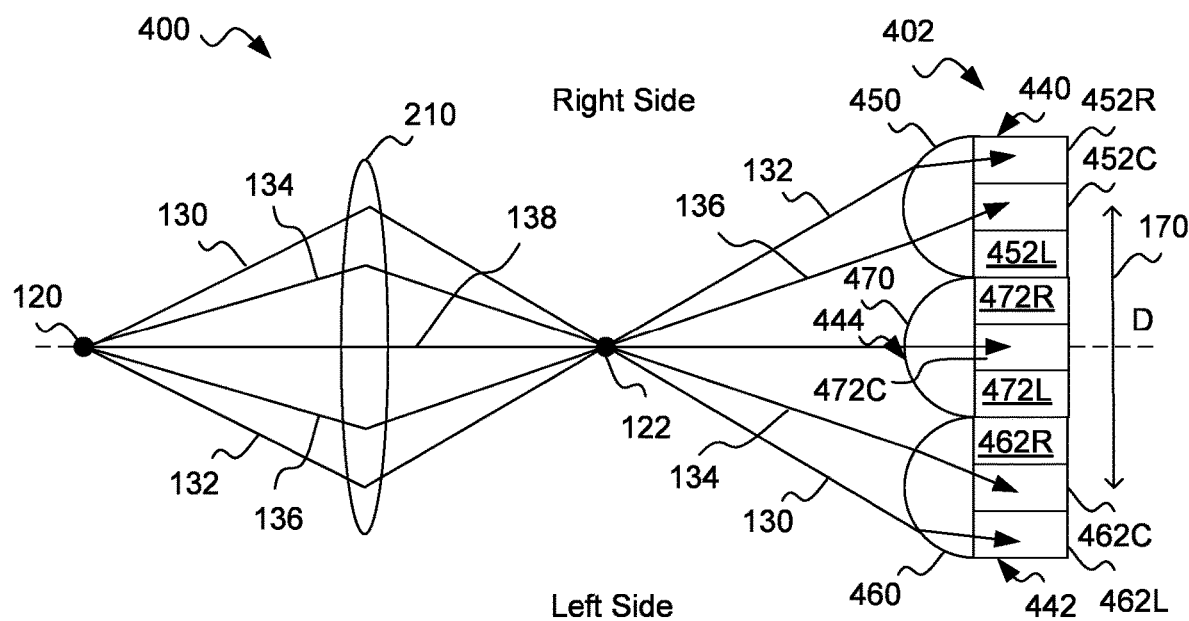
FIG. 4 schematically illustrates an optical system similar to the optical systems of FIG. 1, FIG. 2, and FIG. 3, in accordance with an embodiment of the present invention.

FIG. 4 schematically illustrates an optical system 400, in accordance with an embodiment of the present invention. FIG. 4 is similar to FIG. 1, FIG. 2, and FIG. 3. Imaging lens 210 is not covered by any mask to block lights 134, 136, and 138 propagating from object 120 to image 122.

Optical system 400 comprises an imaging lens 210 and an array of sensing pixels 402 comprising sensing pixels 440, 442, 444 and others. Sensing pixel 440 comprises a microlens 450, a right photodiode 452R, a central photodiode 452C, and a left photodiode 452L. Sensing pixel 442 comprises a microlens 460, a right photodiode 462R, a central photodiode 462C, and a left photodiode 462L. Sensing pixel 444 comprises a microlens 470, a right photodiode 472R, a central photodiode 472C, and a left photodiode 472L.

Since imaging lens 210 is not covered by any mask, all lights 130, 132, 134, 136, and 138 pass through different parts of imaging lens 210, and intersect at image 122. Light 130 coming from right side arrives at sensing pixel 442, and will be refracted by microlens 460 toward left photodiode 462L of sensing pixel 442. Light 134 also coming from right side arrives at the same sensing pixel 442, and will be refracted by microlens 460 toward the central photodiode 462C of sensing pixel 442. Light 132 coming from left side arrives at sensing pixel 440, and will be refracted by microlens 450 toward right photodiode 452R of sensing pixel 440. Light 136 also coming from left side arrives at the same sensing pixel 440, and will be refracted by microlens 450 toward the central photodiode 452C of sensing pixel 440. Light 138 arrives at sensing pixel 444 and will be directed toward central photodiode 472C by microlens 470.

For forming the right image, only signals detected by right photodiodes are taken into account. Signals from central photodiodes and left photodiodes are ignored. Similarly, for forming the left image, only signals detected by left photodiodes are taken into account. Signals from central photodiodes and right photodiodes are ignored. Accordingly, in array of sensing pixels 402, only right photodiode 452R of sensing pixel 440 detects light 132 from object 120. And only left photodiode 462L of sensing pixel 442 detects light 130 from object 120. Thus high signal-to-noise value of distance D 170 can be obtained, similar to the effect shown in FIG. 1 and FIG. 3.

FIG. 5A illustrates a sensing pixel 500 comprising a microlens 510 covering photodiodes 512 and 514, in accordance with an embodiment of the present invention. Sensing pixel 500 may be sensing pixel 140 of FIG. 3, photodiode 512 may be photodiode 152L, and photodiode 514 may be photodiode 152R. In this manner, sensing pixel 500 or 140 can detect phase difference in a direction only, i.e., direction x.

FIG. 5B illustrates a sensing pixel 502 comprising a microlens 520 covering 2×2 photodiodes 522, 524, 526, and 528, in accordance with an embodiment of the present invention. Sensing pixel 502 may be sensing pixel 140 of FIG. 3. A pair of photodiodes 522 and 524 and a pair of photodiodes 526 and 528 can be used for detecting phase difference in direction x. A pair of photodiodes 522 and 526 and a pair of photodiodes 524 and 528 can be used for detecting phase difference in direction y, which is perpendicular to direction x. A pair of photodiodes 522 and 528 can detect phase difference in a diagonal direction. A pair of photodiodes 524 and 526 can detect phase difference in another diagonal direction. In this manner, sensing pixel 502 or 140 can detect phase difference at least in two directions. Pair of photodiodes 522 and 524 may be pair of photodiodes 512 and 514 of FIG. 5A.

FIG. 6A illustrates a sensing pixel 600 comprising a microlens 610 covering a one-dimensional series of photodiodes having three photodiodes 612, 614, and 616, in accordance with an embodiment of the present invention. Sensing pixel 600 may be sensing pixel 440 of FIG. 4. photodiode 612 may be photodiode 452L, photodiode 614 may be photodiode 452C, and photodiode 616 may be photodiode 452R. In this manner, sensing pixel 600 or 140 can detect phase difference in a direction only, i.e., direction x.

FIG. 6B illustrates a sensing pixel 602 comprising a microlens 620 covering a two-dimensional array of photodiodes having 3×3 photodiodes 622, 624, 626, 628, 630, 632, 634, 636, and 638, in accordance with an embodiment of the present invention. Sensing pixel 602 may be sensing pixel 440 of FIG. 4. A series of photodiodes 622, 624, and 626, a series of photodiodes 628, 630, and 632, and a series of photodiodes 634, 636, and 638 can be used for detecting phase difference in direction x. A series of photodiodes 622, 628, and 634, a series of photodiodes 624, 630, and 636, and a series of photodiodes 626, 632, and 638 can be used for detecting phase difference in direction y, which is perpendicular to direction x. A series of photodiodes 622, 630, and 638 can detect phase difference in a diagonal direction. A series of photodiodes 626, 630, and 634 can detect phase difference in another diagonal direction. In this manner, sensing pixel 602 or 440 can detect phase difference at least in two directions.

To form the right image, only the right photodiodes are selected, to form the left image, only the left photodiodes are selected. The central photodiodes do not play any role in forming the right and left images. However, the central photodiodes may be used for forming the whole image, especially for forming a focused image.

Figure 7A:
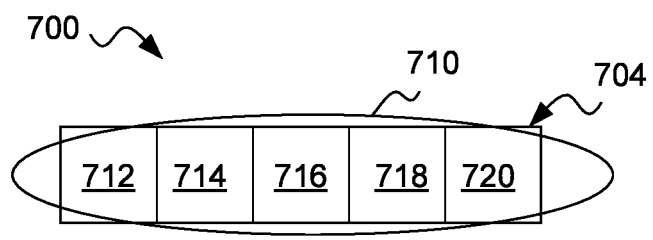
FIG. 7A illustrates a sensing pixel comprising a microlens covering five photodiodes, in accordance with an embodiment of the present invention.

Regarding sensing pixel 440 of FIG. 4, the photodiodes covered under a microlens may be further extended to five or more photodiodes in a one-dimension series, or 5×5 or more photodiodes in a two-dimension array. For example, FIG. 7A illustrates a sensing pixel 700 comprising a microlens 710 covering a one-dimensional series of photodiodes 704 having five photodiodes 712, 714, 716, 718, and 720, in accordance with an embodiment of the present invention.

Sensing pixel 700 may be an extended sensing pixel 440 of FIG. 4. One-dimensional series of photodiodes 704 may correspond to photodiodes 452R, 452C, and 452L of FIG. 4. Photodiode 720 may be photodiode 452R of FIG. 4. In this manner, light 132 is refracted by microlens 710 incident to photodiode 720, and light 136 is refracted by microlens 710 incident to photodiode 718. Photodiode 720 at an end of one-dimensional series of photodiodes 704 detects light 132 from object 120 toward image 122.

Figure 7B:
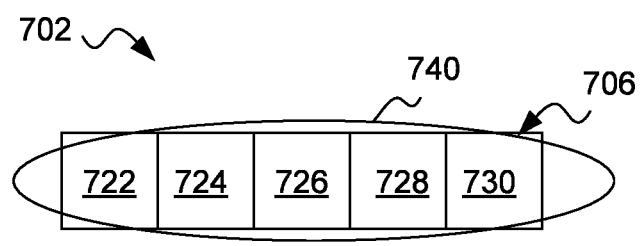
FIG. 7B illustrates a sensing pixel comprising a microlens covering five photodiodes, in accordance with an embodiment of the present invention.

FIG. 7B illustrates a sensing pixel 702 comprising a microlens 740 covering a one-dimensional series of photodiodes 706 having five photodiodes 722, 724, 726, 728, and 730, in accordance with an embodiment of the present invention. Sensing pixel 702 may be an extended sensing pixel 442 of FIG. 4. One-dimensional series of photodiodes 706 may correspond to photodiodes 462R, 462C, and 462L of FIG. 4. Photodiode 722 may be photodiode 462L of FIG. 4. In this manner, light 130 is refracted by microlens 720 incident to photodiode 722, and light 134 is refracted by microlens 720 incident to photodiode 724. Photodiode 722 at an opposite end of one-dimensional series of photodiodes 706, reference to one-dimensional series of photodiodes 704, detects light 130 from object 120 toward image 122.

Figure 7C:
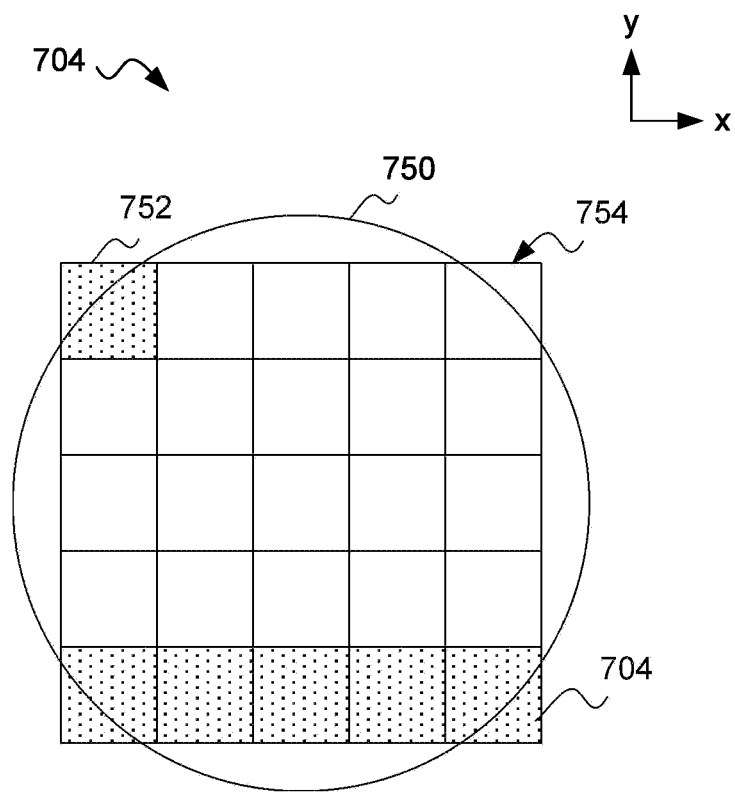
FIG. 7C illustrates a sensing pixel comprising a microlens covering 5×5 photodiodes, in accordance with an embodiment of the present invention.

FIG. 7C illustrates a sensing pixel 704 comprising a microlens 750 covering a two-dimensional array of photodiodes 754 having 5×5 photodiodes 752, in accordance with an embodiment of the present invention. Two-dimensional array of photodiodes 754 may include one-dimensional series of photodiodes 704 of FIG. 7A. Sensing pixel 704 may be an extended sensing pixel 440 of FIG. 4. Similar to sensing pixel 602 comprising 3×3 photodiodes of FIG. 6B, sensing pixel 704 is able to detect the phase difference in direction x, direction y and two diagonal directions.

It is appreciated that a sensing pixel may comprise a microlens covering a one-dimensional series of photodiodes having n photodiodes or a two-dimensional array of photodiodes having n×n photodiodes, where n is integer larger than 2. Photodiode 720, at an end of one-dimensional series of photodiodes 704 of sensing pixel 700, detects light 132 from object 120 toward image 122, and photodiode 722, at an opposite end of one-dimensional series of photodiodes 706 of sensing pixel 702, detects light 130 from object 120 toward image 122, where light 132 and light 130 pass opposite parts of imaging lens 210.

Figure 8:
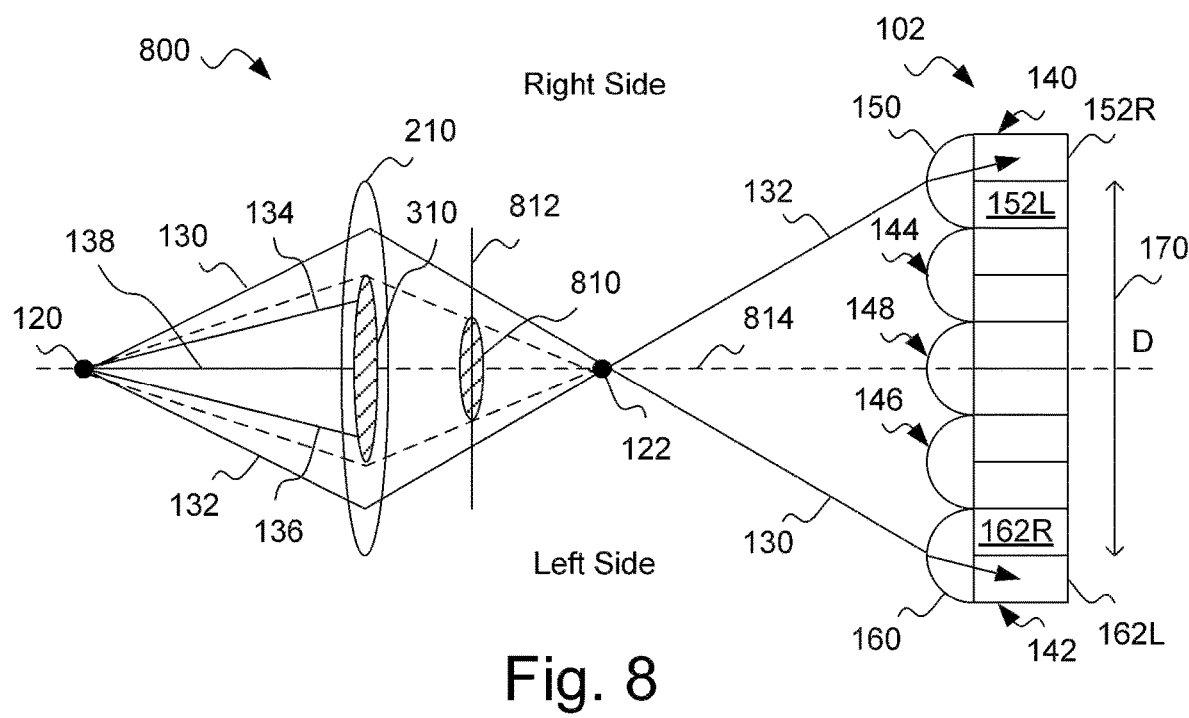
FIG. 8 illustrates an optical system similar to the optical system of FIG. 3, in accordance with an embodiment of the present invention.

FIG. 8 illustrates an optical system 800 similar to optical system 300 of FIG. 3, in accordance with an embodiment of the present invention. Optical system 800 has an optical axis 814. Central mask 310 blocking lights 134, 136, and 138 propagating from object 120 to image 122 through the central part of imaging lens 210, may be replaced by a central mask 810 at a stop plane 812. Stop plane 812 may be located at any plane between imaging lens 210 and image 122. The size of central mask 810 decreases as stop plane 812 is approaching image 122. Central mask 810 blocks lights 134, 136, and 138 propagating from object 120 to image 122 through the central part of imaging lens 210. Stop plane 812 may be located at imaging lens 210, thus central mask 810 is identical to central mask 310. If imaging lens 210 is a lens system including more than one lens, stop plane 812 may be a stop plane of the lens system.

Figure 9A:
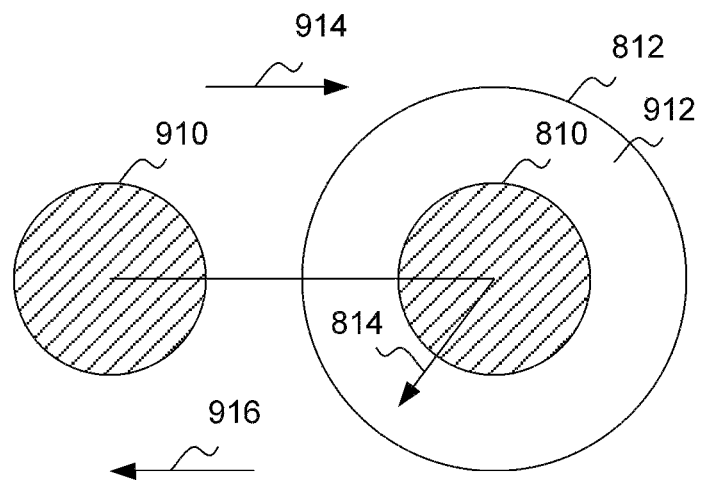
FIG. 9A illustrates a mechanism of a removable circular mask, in accordance with an embodiment of the present invention.

FIG. 9A illustrates a mechanism of a removable circular central mask 810, in accordance with an embodiment of the present invention. Stop plane 812 includes an empty space 912. Circular mask 810 is positioned within empty space 912 centered at optical axis 814, which is perpendicular to stop plane 812. Circular mask 810 blocks lights 134, 136, and 138 propagating from object 120 to image 122 through the central part of imaging lens 210. Circular mask 810 may be removed by moving it along arrow 916 to an off position from stop plane 812 as circular mask 910, to pass lights 134, 136, and 138 through the central part of imaging lens 210. When a central mask is required, circular mask 910 is moved along arrow 914 to center at optical axis 814 as circular mask 810. The circular central mask may be moved by an actuator (not shown).

Figure 9B:
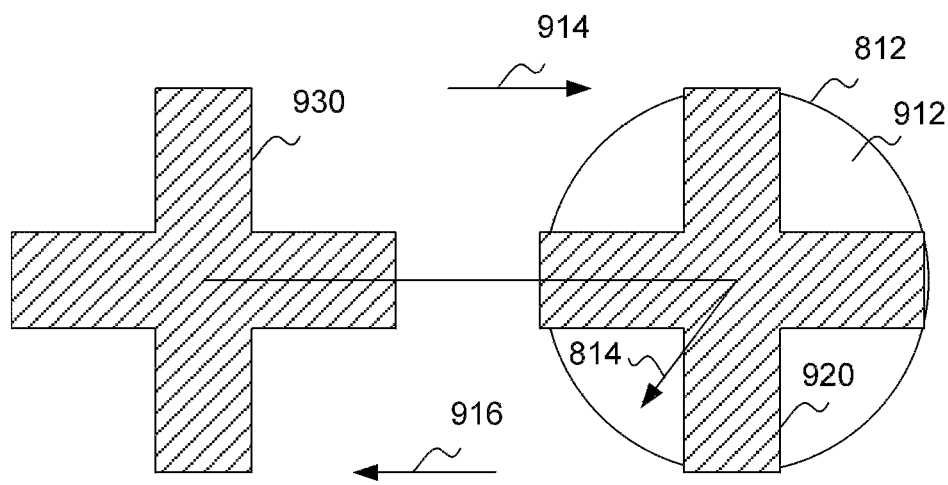
FIG. 9B illustrates a mechanism of a removable cross shape mask, in accordance with an embodiment of the present invention.

FIG. 9B illustrates a mechanism of a removable cross shape central mask 920, in accordance with an embodiment of the present invention. FIG. 9B is similar to FIG. 9A. Stop plane 812 includes empty space 912. Cross shape mask 920 is positioned within empty space 912 centered at optical axis 814, which is perpendicular to stop plane 812. Cross shape mask 920 blocks lights 134, 136, and 138 propagating from object 120 to image 122 through the central part of imaging lens 210. Cross shape mask 920 may be removed by moving it along arrow 916 to an off position from stop plane 812 as cross shape mask 930, to pass lights 134, 136, and 138 through the central part of imaging lens 210. When a central mask is required, cross shape mask 930 is moved along arrow 914 to center at optical axis 814 as cross shape mask 920. The cross shape central mask may be moved by an actuator (not shown).

Figure 10A:
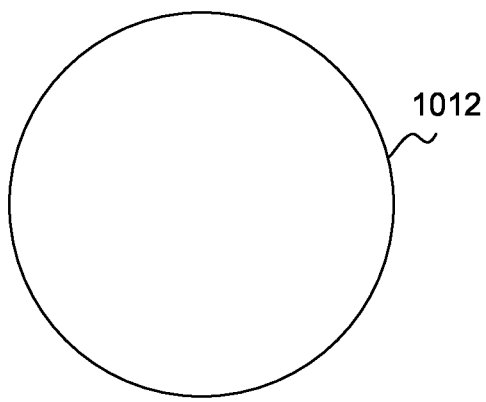
FIG. 10A illustrates a liquid crystal switch fully transparent, in accordance with an embodiment of the present invention.
Figure 10B:
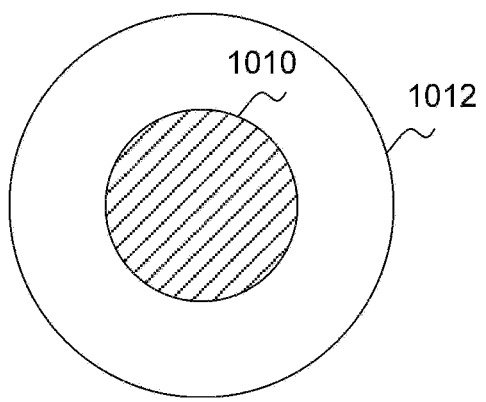
FIG. 10B illustrates a central opaque part of a liquid crystal switch having a circular shape, in accordance with an embodiment of the present invention.
Figure 10C:
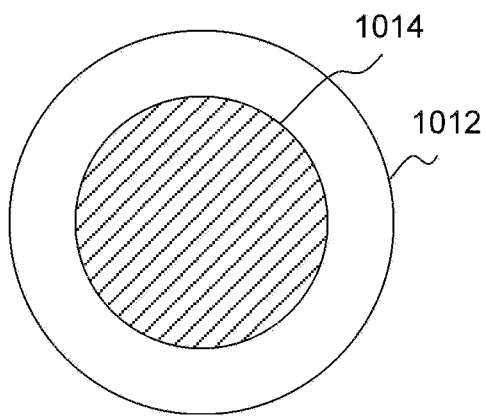
FIG. 10C illustrates the size of a central opaque part of a liquid crystal switch being decreased and increased, in accordance with an embodiment of the present invention.

FIGS. 10A-C illustrate another mechanism of a removable central mask, in accordance with an embodiment of the present invention. FIGS. 10A-C illustrate a liquid crystal switch (LCS) 1012 positioned at a stop plane, for example, stop plane 812 of FIG. 8. FIG. 10A illustrates that LCS 1012 is fully transparent. Thus, all lights 130, 132, 134, 136, 138 as shown in FIG. 8 will transmit through LCS 1012. FIG. 10B illustrates that a central part 1010 of LCS 1012 having a circular shape becomes opaque and will block lights 134, 136, and 138 as shown in FIG. 8. Furthermore, FIG. 10C illustrates that the size of central part 1010 can be decreased and increased, for example, a larger central mask 1014 is shown. This will properly control the balance of signal-to-noise ratio of the right and left photodiodes signal, respectively, and the overall intensity. It is appreciated that LCS 1012 can change the pattern of the opaque and transparent parts, thus it can change the size of central mask 1010 having circular shape.

Figure 10D:
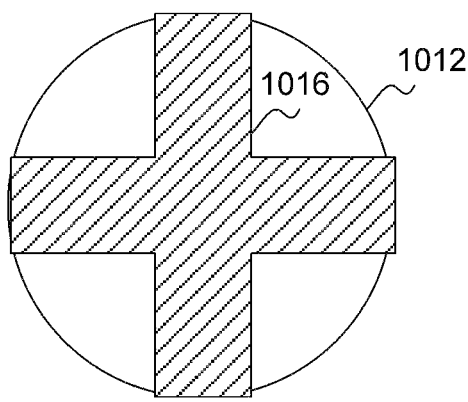
FIG. 10D illustrates an opaque part of liquid crystal switch having a cross shape, in accordance with an embodiment of the present invention.

FIG. 10D illustrates an opaque part having a cross shape 1016 of LCS 1012, in accordance with an embodiment of the present invention. Similar to cross shape mask 920 of FIG. 9B, opaque part 1016 blocks lights 134, 136, and 138 as shown in FIG. 8. LCS 1012 can change the pattern of the opaque and transparent parts. A LCS comprises two polarizers, two electrodes, and liquid crystal material between the two electrodes. The two electrodes are disposed between the two polarizers. The transmittance of the LCS is electronically controllable.

Figure 11A:
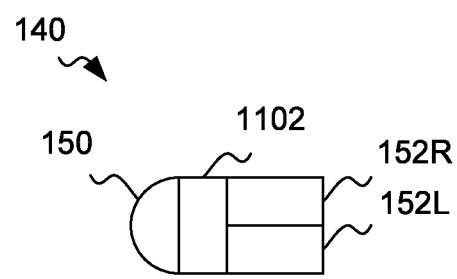
FIG. 11A illustrates a sensing pixel further comprising a color filter, in accordance with an embodiment of the present invention.

FIG. 11A illustrates sensing pixel 140 of FIGS. 1-3 and 8 further comprising a color filter 1102, in accordance with an embodiment of the present invention. Thus, sensing pixel 140 comprises microlens 150, and photodiodes 152R and 152L covered by color filter 1102. Similarly, sensing pixel 142 of FIGS. 1-3 and 8 also comprises a color filter. The color filters of sensing pixels 140 and 142 may have the same color or different colors.

Pair of photodiodes 512 and 514 of FIG. 5A are the same as pair of photodiodes 152L and 152R of sensing pixel 140. Pair of photodiodes 512 and 514 are covered by a color filter. Similarly, 2×2 photodiodes 522, 524, 526, and 528 of FIG. 5B are covered by a color filter. Pairs of photodiodes of two sensing pixels are covered by two color filters. The two color filters may have the same color or different colors. Similarly, 2×2 photodiodes of two sensing pixels are covered by two color filters, respectively. The two color filters may have the same color or different colors.

Figure 11B:
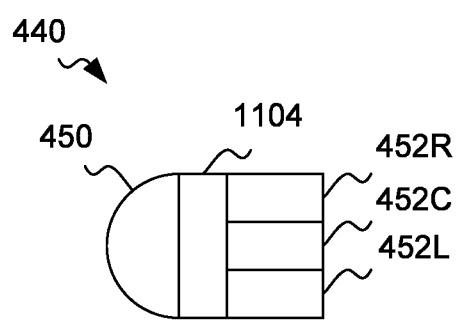
FIG. 11B illustrates a sensing pixel further comprising a color filter, in accordance with an embodiment of the present invention.

FIG. 11B illustrates sensing pixel 440 of FIG. 4 further comprising a color filter 1104, in accordance with an embodiment of the present invention. Thus, sensing pixel 440 comprises microlens 450, and photodiodes 452R, 452C, and 452L covered by color filter 1104. Similarly, sensing pixel 442 of FIG. 4 also comprises a color filter. The color filters of sensing pixels 440 and 442 may have the same color or different colors.

Figure 11C:
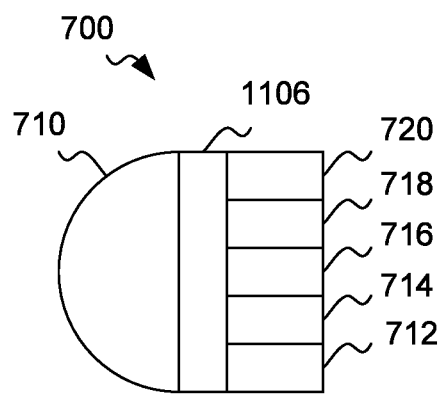
FIG. 11C illustrates a sensing pixel further comprising a color filter, in accordance with an embodiment of the present invention.

FIG. 11C illustrates sensing pixel 700 of FIG. 7A further comprising a color filter 1106, in accordance with an embodiment of the present invention. Thus, sensing pixel 700 comprises microlens 710, and one-dimensional series of photodiodes 704 having five photodiodes 712, 714, 716, 718, and 720 covered by color filter 1106. Similarly, sensing pixel 702 of FIG. 7B also comprises a color filter. The color filters of sensing pixels 700 and 702 may have the same color or different colors.

One-dimensional series of photodiodes having five or n photodiodes 704 is covered by color filter 1106. Similarly, two-dimensional array of photodiodes having 5×5 or n×n photodiodes 754 of sensing pixel 704 of FIG. 7C may be covered by a color filter. Color filters of two sensing pixels having 5×5 or n×n photodiodes may have the same color or different colors.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An optical system comprising,
an imaging lens for imaging an object to an image; and
a sensing pixel array for detecting lights from the object, wherein each light passes different part of the imaging lens toward the image;
wherein the sensing pixel array comprises a first sensing pixel and a second sensing pixel, each sensing pixel comprising a microlens covering a one-dimensional series of photodiodes having n photodiodes, n is integer larger than two;
wherein a photodiode at an end of the one-dimensional series of photodiodes of the first sensing pixel detects a first light from the object toward the image, and a photodiode at an opposite end of the one-dimensional series of photodiodes of the second sensing pixel detects a second light from the object toward the image;
wherein the first light and the second light pass opposite parts of the imaging lens; and
wherein positions of the first sensing pixel and the second sensing pixel are used to determine a distance of the object to the imaging lens.

2. The optical system of claim 1, wherein each of the first and second sensing pixels comprises the microlens covering a two-dimensional array of photodiodes having n×n photodiodes, n is integer larger than two, and wherein the two-dimensional array of photodiodes having n×n photodiodes includes the one-dimensional series of photodiodes having n photodiodes.

3. The optical system of claim 1, wherein positions of the first sensing pixel and the second sensing pixel are determined by a correlation of a right image and a left image, wherein the right image comprises the first light detected by the photodiode at the end of the one-dimensional series of photodiodes of the first sensing pixel, and the left image comprises the second light detected by the photodiode at the opposite end of the one-dimensional series of photodiodes of the second sensing pixel.

4. The optical system of claim 1, wherein n is 3.

5. The optical system of claim 1, wherein photodiodes of the one-dimensional series of photodiodes having n photodiodes of the first sensing pixel are covered by a color filter of a first color, and photodiodes of the one-dimensional series of photodiodes having n photodiodes of the second sensing pixel are covered by a color filter of a second color, the first color is same as the second color.

6. The optical system of claim 1, wherein photodiodes of the one-dimensional series of photodiodes having n photodiodes of the first sensing pixel are covered by a color filter of a first color, and photodiodes of the one-dimensional series of photodiodes having n photodiodes of the second sensing pixel are covered by a color filter of a second color, the first color is different from the second color.

7. The optical system of claim 2, wherein photodiodes of the two-dimensional array of photodiodes having n×n photodiodes of the first sensing pixel are covered by a color filter of a first color, and photodiodes of the two-dimensional array of photodiodes having n×n photodiodes of the second sensing pixel are covered by a color filter of a second color, the first color is same as the second color.

8. The optical system of claim 2, wherein photodiodes of the two-dimensional array of photodiodes having n×n photodiodes of the first sensing pixel are covered by a color filter of a first color, and photodiodes of the two-dimensional array of photodiodes having n×n photodiodes of the second sensing pixel are covered by a color filter of a second color, the first color is different from the second color.

9. An optical system comprising,
an imaging lens for imaging an object to an image;
a sensing pixel array for detecting lights from the object passing the imaging lens toward the image; and
a mask centered at an optical axis of the optical system blocking lights from the object passing central part of the imaging lens toward the image;
wherein the sensing pixel array comprises a first sensing pixel and a second sensing pixel, each sensing pixel comprising a microlens covering a pair of photodiodes;
wherein a photodiode at a side of the pair of photodiodes of the first sensing pixel detects a first light from the object toward the image, and a photodiode at an opposite side of the pair of photodiodes of the second sensing pixel detects a second light from the object toward the image;
wherein the first light and the second light pass opposite parts of the imaging lens; and
wherein positions of the first sensing pixel and the second sensing pixel are used to determine a distance of the object to the imaging lens.

10. The optical system of claim 9, wherein each of the first and second sensing pixels comprises the microlens covering a two-dimensional array of photodiodes having 2×2 photodiodes, and wherein the two-dimensional array of photodiodes having 2×2 photodiodes includes the pair of photodiodes.

11. The optical system of claim 9, wherein positions of the first sensing pixel and the second sensing pixel are determined by a correlation of a right image and a left image, wherein the right image comprises the first light detected by the photodiode at a side of the pair of photodiodes of the first sensing pixel, and the left image comprises the second light detected by the photodiode at an opposite side of the pair of photodiodes of the second sensing pixel.

12. The optical system of claim 9, wherein photodiodes of the pair of photodiodes of the first sensing pixel are covered by a color filter of a first color, and photodiodes of the pair of photodiodes of the second sensing pixel are covered by a color filter of a second color, the first color is same as the second color.

13. The optical system of claim 9, wherein photodiodes of the pair of photodiodes of the first sensing pixel are covered by a color filter of a first color, and photodiodes of the pair of photodiodes of the second sensing pixel are covered by a color filter of a second color, the first color is different from the second color.

14. The optical system of claim 10, wherein photodiodes of the two-dimensional array of photodiodes having 2×2 photodiodes of the first sensing pixel are covered by a color filter of a first color, and photodiodes of the two-dimensional array of photodiodes having 2×2 photodiodes of the second sensing pixel are covered by a color filter of a second color, the first color is same as the second color.

15. The optical system of claim 10 wherein photodiodes of the two-dimensional array of photodiodes having 2×2 photodiodes of the first sensing pixel are covered by a color filter of a first color, and photodiodes of the two-dimensional array of photodiodes having 2×2 photodiodes of the second sensing pixel are covered by a color filter of a second color, the first color is different from the second color.

16. The optical system of claim 9, wherein the mask is removable.

17. The optical system of claim 9, wherein the mask is a circular mask.

18. The optical system of claim 9, wherein the mask is a cross shape mask.

19. The optical system of claim 9, wherein the mask is a liquid crystal switch blocking lights from the object passing central part of the imaging lens toward the image.

20. The optical system of claim 19, wherein the liquid crystal switch has an opaque part of one of circular shape and cross shape.

* * * * *